United States Patent [19]

Misencik

[11] 3,930,187

[45] Dec. 30, 1975

[54] GROUND FAULT INTERRUPTER WITH MEANS PROTECTING AGAINST A GROUNDED NEUTRAL CONDITION AND WITH A TEST CIRCUIT FOR TESTING PERFORMANCE

[75] Inventor: John J. Misencik, Shelton, Conn.

[73] Assignee: Westinghouse Electric Corporation, Pittsburgh, Pa.

[22] Filed: Nov. 20, 1973

[21] Appl. No.: 417,659

[52] U.S. Cl. ............ 317/18 D; 324/28 CB; 317/9 D
[51] Int. Cl.² ...................... H02H 3/08; H02H 3/28
[58] Field of Search...... 317/9 D, 18 R, 18 D, 33 R; 324/28 CB, 51, 55

[56] References Cited
UNITED STATES PATENTS

| | | | |
|---|---|---|---|
| 3,611,035 | 10/1971 | Douglas | 317/18 D |
| 3,621,334 | 11/1971 | Burns et al. | 317/18 D |
| 3,662,218 | 5/1972 | Whitlow | 317/18 D |
| 3,700,967 | 10/1972 | Hoss | 317/18 D |
| 3,787,708 | 1/1974 | Hobson, Jr. | 317/18 D |

*Primary Examiner*—J. D. Miller
*Assistant Examiner*—Patrick R. Salce
*Attorney, Agent, or Firm*—G. H. Telfer

[57] ABSTRACT

In a ground fault interrupter of the differential transformer type having a means for protection against a grounded neutral condition, which means is located on the supply side of the differential transformer, there is provided a test circuit branch connected between a first point on the load side of the differential transformer to the line conductor and on the supply side of the differential transformer to the neutral conductor. This arrangement provides the capability to test performance of the differential transformer and also the means for protection against the grounded neutral condition.

4 Claims, 1 Drawing Figure

U.S. Patent    Dec. 30, 1975    3,930,187
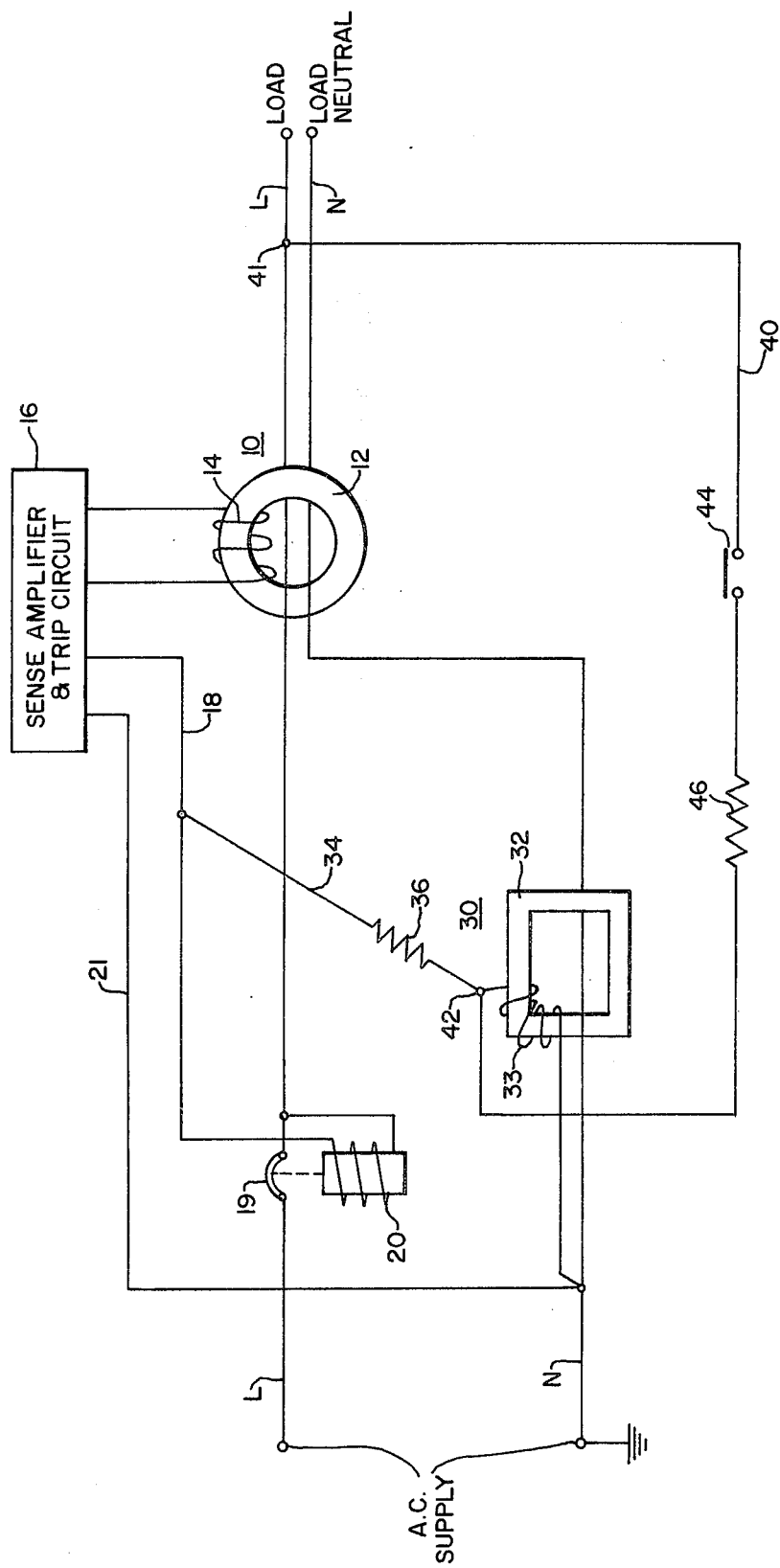

GROUND FAULT INTERRUPTER WITH MEANS PROTECTING AGAINST A GROUNDED NEUTRAL CONDITION AND WITH A TEST CIRCUIT FOR TESTING PERFORMANCE

BACKGROUND OF THE INVENTION

This invention relates to ground fault interrupter apparatus of the differential transformer type.

There is considerable interest in ground fault interrupters of the differential transformer type for protecting persons against electrical shock hazards. The concept is for the differential transformer primaries, that are the hot line and neutral conductors of the supply system, to become unbalanced in current to produce a signal on the secondary sensing winding upon the occurrence of a current to ground from the hot line conductor. It is recognized, however, that the apparatus will not sense such a ground leakage current if there is a ground occurring from the neutral conductor on the load side of the differential transformer. Such a grounded neutral provides a path for ground leakage current from the hot line conductor to enter the neutral conductor, and return to ground at the supply neutral, so the differential transformer sees no imbalance.

Techniques to avoid the grounded neutral problem have been recognized and effectively used. One such way is that disclosed in copending application Ser. No. 368,915, filed June 11, 1973, by K. R. Coley and J. J. Misencik and assigned to the present assignee. In accordance with the apparatus therein discloses an auxiliary transformer core is placed on the neutral conductor and that conductor acts as the secondary winding of the auxiliary transformer. The auxiliary transformer has a primary winding that is connected between the line and neutral conductors. The core of the auxiliary transformer is selected of a material having a high enough permeability so that it saturates under normal operating conditions within each half cycle of the applied AC supply voltage resulting in a brief pulse of voltage induced in the neutral conductor. This permits the apparatus to perform its protective function even though the neutral conductor may be grounded on the load side of the differential transformer.

Other forms of grounded neutral protection means have been proposed or used in ground fault interrupters and while different in structure and operation from that just described they are generally characterized by employment of an auxiliary transformer core on the neutral conductor. The present invention pertains to such apparatus generally and does not require for its practice a particular form of grounded neutral protection means from among those known in the art.

Commercial production of ground fault interrupters necessarily entails careful consideration of design factors influencing reliability of performance. In this respect the industry is principally governed by requirements of Underwriter Laboratories (U.L.). For some time the standards of U.L. have required that a means to test the operability of the differential transformer be provided. More particularly, the U.L. standards have required that a test circuit branch be connected across the differential transformer from a point on the load side of the hot line conductor to the supply side of the neutral conductor. This circuit branch contains a normally open switch that can be closed, preferably at regular periodic intervals by a user, resulting in an imbalance of currents in the conductors that pass through the differential transformer core, which imbalance should be sufficient to trip the apparatus and open the circuit thus confirming operability of the transformer. U.L. standards up to the present have not, however, required any means to test the operability of the grounded neutral protection portion of the apparatus. Thus it is possible that a unit complying with all the U.L. standards would appear to perform adequately in a test of the differential transformer yet be disabled because the grounded neutral protection portion does not operate. It is submitted, based on the personal experience of the present applicant, that the reason U.L. permits this apparent gap in performance testing capability is that there has been disclosed to U. L. no satisfactory scheme sufficiently effective to test both of the differential transformer and grounded neutral protection portions of the apparatus.

An apparent solution to the problem of testing both portions of the apparatus was previously disclosed in application Ser. No. 237,078, filed Mar. 22, 1972, by the present applicant and assigned to the present assignee, which application is now abandoned. In accordance with the arrangement therein disclosed, a test circuit branch was connected across two points on the neutral conductor that encompass both the differential transformer and the grounded neutral protection means. While this arrangement was and is believed to be effective for the intended purposes, it was found that U.L. required greater assurance of effective testing of the differential transformer by maintaining its requirement that the test circuit branch be connected to a point on the hot line conductor on the load side thereof with respect to the differential transformer.

The problem of improving the capability of testing both portions of the apparatus, while still abiding by the U.L. requirements for the connection of the test circuit branch, led to the present invention.

SUMMARY OF THE INVENTION

In accordance with this invention, a ground fault interrupter of the differential transformer type and having a means for protection against the grounded neutral condition, such as an auxiliary transformer, has that means located on the supply side of the differential transformer while previously that means could be located on either side and was usually on the load side. There is also provided a test circuit branch connected between a first point on the load side of the differential transformer to the hot line conductor and on the supply side of the differential transformer to the neutral conductor. This arrangement provides the capability to test performance of the differential transformer and also the means for protection against the grounded neutral condition.

Locating the grounded neutral protection means on the supply side of the differential transformer is not per se novel, since there was disclosed in copending application Ser. No. 158,337, filed June 30, 1971 by K. R. Coley, J. J. Misencik and J. R. Reeves and assigned to the present assignee, an arrangement that included an auxiliary transformer core for grounded neutral protection that in the specifically described embodiment therein was located on the supply side of the differential transformer. Yet it is submitted to be the case that the location of the grounded neutral protection means has not previously been recognized to be significant insofar as the relation thereof to the test circuit branch is concerned. Therefore, it is the case that the present invention significantly resides in the fact that the grounded neutral protection means is located on the supply side of the differential transformer coupled with the fact that the test circuit branch is connected from a point on the hot line conductor on the load side of the differential transformer to a point on or electrically proximate to the neutral conductor on the supply side of the differential transformer. In apparatus that employs grounded neutral protection means as described in the abovementioned copending application (Ser. No. 368,915) where the grounded neutral auxiliary transformer has a primary winding connected between the line and neutral conductors of the system, it is beneficial that the point of connection of the test circuit branch be adjacent the primary winding on the auxiliary core at a point removed from the neutral conductor rather than to the neutral conductor directly. Thus it is to be understood that the expression "electrically proximate to the neutral conductor" is intended to encompass points of connection directly to the neutral conductor or which are removed therefrom only by the impedance of the primary winding which is a small resistive impedance as compared with the substantial resistance employed in series with the primary winding on the line side thereof. The reason for preferring this point of connection is that it permits a test of the operating capability of that primary winding on the auxiliary core.

While not having specifically to do with test circuit functioning, but rather with general reliability of the apparatus, it is also preferred that the intermediate conductor between the line and neutral conductors that includes the primary winding on the auxiliary core be connected to the line conductor through the trip coil of the circuit breaker mechanism of the apparatus. This feature, while not essential, is of benefit in protecting against damage to any part of the apparatus from high voltage surges on the line.

BRIEF DESCRIPTION OF THE DRAWING

The single FIGURE of the drawing is a circuit schematic of an embodiment of the present invention.

DESCRIPTION OF THE PREFERRED EMBODIMENT

Referring to the single FIGURE of the drawing, ground fault interrupter apparatus of the differential transformer type is shown wherein a differential transformer 10 having a core 12 is provided with conductors, including a hot conductor, referred to herein sometimes as the line conductor L, and a neutral conductor N. The conductors L and N extend through the core 12 as primary windings each of a single turn although multiple turn windings may be used if desired. Additionally, the primary conductors may be disposed in a coaxial arrangement. A secondary sensing winding 14, usually of a plurality of turns, is also provided on the core 12 for sensing an imbalance in the conduction current levels of the primary conductions L and N that indicates the occurrence of a ground fault. The sensing coil 14 is connected to a sense amplifier and trip circuit 16 that is connected between the conductors L and N by conductive connections 18 and 21, respectively, on the supply side of the differential transformer 10. The sense amplifier and trip circuit 16 is responsive to the level of the sensed voltage on winding 14 in order to actuate a circuit breaker 19, through solenoid trip coil 20, on the line conductor, to open the conductor L upon the occurrence of a predetermined current imbalance between conductors L and N.

The illustrative system of the FIGURE is merely exemplary of the environment in which the invention may be practiced. This is in the context of an AC electrical distribution system, with a neutral conductor grounded at the supply end, connected between a supply and at least one load; here the electrical system is a single phase, two wire system. Other types of electrical systems (e.g. differing in numbers of phases and wires) may be provided with ground fault interrupters in accordance with this invention as will be apparent to those skilled in the art.

The apparatus also includes grounded neutral protection means 30 that is responsive to a fault to ground from the neutral conductor on the load side of the differential transformer to produce a current imbalance in the differential current transformer. In this instance, the grounded neutral protection means is of the form in the above referred to copending application Ser. No. 368,915. It will be understood however that other forms of grounded neutral protection means may be employed in the practice of this invention, particularly those employing auxiliary transformers. In the embodiment shown the means 30 includes a second magnetic core 32 through which conductor N passes as a single turn secondary winding. The core 32 also has a multi-turn primary winding 33 thereon. The primary winding 33 is in a circuit branch 34 connected between the conductors L and N. In the preferred form shown the upper end of conductor 34 is connected to the line conductor L through the trip coil 20 for purposes that will be subsequently explained although it may also be connected directly to conductor L. Also in accordance with the teachings of the foregoing referred to copending application a substantial current limiting resistor 36 is in conductor 34 on the line side of winding 33. In this preferred arrangement the core 32 is selected of high permeability material that saturates within each half cycle of the normal AC voltage provided by the supply so as to induce a brief pulse into the neutral conductor as is described in the copending application.

While not essential to the performance of the grounded neutral protection functions of means 30, but important to the practice of the present invention, the means 30 is located on the supply side of the differential transformer 10 and the neutral conductor N passes through core 32 before entering core 12.

In accordance with the specific improvement of the present invention a test circuit branch 40 is connected between a first point 41 on the hot line conductor on the load side of differential transformer 10 and a second point 42 that is on or at least electrically proximate to the neutral conductor on the supply side of differential transformer 10. As shown in this embodiment the point 42 is located between the primary winding 33 and the current limiting resistor 36. The primary winding 33 has small electrical resistance, e.g. on the order of 300 ohms, and hence point 42 is electrically proximate the neutral conductor. On the other hand, the resistor 36 has very substantial resistance, in a specific preferred form of a magnitude of 33,000 ohms, so that it can be seen the point 42 is at the potential of the neutral conductor on the supply side rather than at the potential of the line conductor on the supply side.

The reasons for so locating point 42 and the terminus of test circuit branch 40 is significant for the functions desired. The test circuit branch is to test the ability of the apparatus upon occurrence of either a line to ground fault condition or a neutral to ground fault condition meaning that all aspects of the apparatus must be involved in the test procedure. If the point 42 were located directly on the neutral conductor, say at the point on the neutral conductor to which conductor 21 is connected, the apparatus could pass a test and yet still be impaired because of a defect of the primary coil 33. By locating point 42 as shown a ground fault interrupter will not pass the test if winding 33 is defective.

The circuit branch 40 includes a normally open test switch 44 and also includes a resistor 46 to develop current flow between points 41 and 42 by reason of the difference of potential therebetween. The branch 40 is therefore located as prescribed by U.L. and yet provides function in addition to those prescribed in that the closing of button 44, which the user is instructed to do at periodic intervals, will check the operation of the differential transformer portion 10 and also of the grounded neutral protection means 30.

By this arrangement the current developed through circuit branch 40, initiated by the user closing switch 44, flows through the primary winding 33 of the grounded neutral protection means 30 so that all significant aspects of the apparatus can be checked. If there were a defect such as an electrical discontinuity in circuit branch 34 above point 42 then the test current would still check the unit for ground fault capability, however, the ability to have grounded neutral operations would be impaired. Such conceivable impairment should therefore be avoided by high reliability construction and rigorous factory testing.

The fault test current is prescribed by U.L. to be of a magnitude of 5ma. so as to provide a true test of the apparatus. Such a test current is also sufficient to drive the core 32 into saturation for its functioning as a grounded neutral protection means.

It is also the case that if the test switch 44 is closed and a hazardous ground occurs simultaneously from the hot line conductor L, the test circuit current is capable of adding its signal to the output of the grounded neutral protection means to effect a disconnect, which is also required by U.L.

As indicated hereabove the circuit branch 34 is connected to conductor 18 and through trip coil 20 to the hot line conductor L. Alternatively, it may be connected directly to the hot line conductor L. The purpose of making the connection as shown is so that the trip coil 20 provides some surge suppression capability in the event of high surge voltages on the hot line conductor L. The connection of conductor 18 to line L through the trip coil 20 also helps to avoid the effect of surges on the circuit 16.

While the arrangement of differential transformer, grounded neutral protection means, and test circuit branch in accordance with this invention may be used with a variety of specific forms of apparatus, it is mentioned by way of even more complete description that the sense amplifier and trip circuit 16 may be and preferably is in accordance with the teachings of copending application Ser. No. 302,949, filed Nov. 1, 1972 by J. C. Engel, R. T. Elms and the present applicant, and assigned to the present assignee. It is also mentioned by way of further description that the assemblage of the elements shown in the drawing may be and preferably is in accordance with the teachings of copending application Ser. No. 287,291, filed Sept. 11, 1972, by K. R. Coley and the present applicant and assigned to the present assignee, which relates particularly to hardware arrangements for miniaturizing a ground fault interrupter in a unit incorporating a circuit breaker while being no bigger than a conventional circuit breaker alone. Various other forms of apparatus in accordance with this invention will be apparent to those skilled in the art.

I claim:

1. Ground fault interrupter apparatus comprising:

a differential current transformer including a magnetic core, a plurality of primary windings on said core, each being one of the line and neutral conductors of an AC electrical distribution system connected between a supply and at least one load, and a secondary sensing winding on said core for sensing current unbalance between currents in said primary windings, said neutral conductor being grounded at a supply terminal thereof;

means responsive to a predetermined sensed signal on said sensing winding to open at least one of said line conductors;

grounded neutral protection means responsive to a fault to ground from the neutral conductor on the load side of the differential transformer to produce a current imbalance in said differential current transformer, said grounded neutral protection means being associated with the neutral conductor on the supply side of said differential current transformer;

test means to test the ability of the apparatus to trip upon occurrence of either line to ground fault conditions or neutral to ground fault conditions, said test means comprising a circuit branch connected from a first point on a line conductor on the load side of said differential current transformer and a second point electrically proximate the neutral conductor on the supply side of said differential current transformer, said circuit branch including a normally open test switch that is closable to cause unbalanced currents in said primary windings;

said grounded neutral protection means comprising an additional transformer having a second magnetic core, a primary winding on said second magnetic core connected between the line and neutral conductors, the neutral conductor of the system being a secondary winding on said second core; and said second point to which said test circuit branch is connected is located adjacent said primary winding of said additional transformer on the side thereof opposite the neutral conductor.

2. The subject matter of claim 1 wherein: a current limiting resistor is connected in series with said primary winding on said second core on the line side of said second point for connection of said test circuit branch.

3. The subject matter of claim 1 wherein: said means responsive to a predetermined sensed signal comprises a circuit breaker having a trip coil, and said primary winding connected between the line and neutral conductors is connected to the line conductor through said trip coil.

4. In ground fault interrupter apparatus of the differential transformer type which includes a means for protection against disablement upon occurrence of a grounded neutral conductor on the load side of the differential transformer, the improvement comprising: said grounded neutral protection means being associated with the neutral conductor on the supply side of the differential transformer and a test circuit branch is connected from a first point on a line conductor on the load side of the differential current transformer to a second point electrically proximate the neutral conductor on the supply side of the differential current transformer and said test circuit branch comprises a normally open test switch that when closed conducts a current through said grounded neutral protection means as well as causing current imbalance in said differential current transformer; said grounded neutral protection means comprising a core through which the neutral conductor passes as a single turn secondary winding, said core having a primary winding that is in an intermediate circuit branch connected between the line and neutral conductors on the supply side of the apparatus, and said second point being located between the primary winding and a current limiting resistor in the intermediate circuit branch.

* * * * *